United States Patent
Lei et al.

(10) Patent No.: US 9,179,488 B2
(45) Date of Patent: Nov. 3, 2015

(54) VEHICLE TELEMATICS CONNECTION RETRY

(71) Applicant: General Motors LLC, Detroit, MI (US)

(72) Inventors: Yao Hui Lei, Windsor (CA); Andrew J. Macdonald, Grosse Pointe Park, MI (US); Ayman R. Daoud, Novi, MI (US); Dipankar Pal, Sylvania, OH (US); David George, Farmington Hills, MI (US); James J. Piwowarski, Holly, MI (US); Curtis L. Hay, West Bloomfield, MI (US)

(73) Assignee: General Motors LLC, Detroit, MI (US)

( * ) Notice: Subject to any disclaimer, the term of this patent is extended or adjusted under 35 U.S.C. 154(b) by 100 days.

(21) Appl. No.: 14/163,730

(22) Filed: Jan. 24, 2014

(65) Prior Publication Data

US 2015/0215986 A1    Jul. 30, 2015

(51) Int. Cl.
*H04W 76/02*    (2009.01)
*H04W 48/18*    (2009.01)
*H04W 88/06*    (2009.01)

(52) U.S. Cl.
CPC ............ *H04W 76/028* (2013.01); *H04W 48/18* (2013.01); *H04W 88/06* (2013.01)

(58) Field of Classification Search
None
See application file for complete search history.

(56) References Cited

U.S. PATENT DOCUMENTS

| 2008/0176565 | A1* | 7/2008 | Eerolainen et al. | 455/436 |
|---|---|---|---|---|
| 2011/0039533 | A1* | 2/2011 | Yi et al. | 455/419 |
| 2011/0039559 | A1* | 2/2011 | Yi et al. | 455/435.2 |
| 2012/0289166 | A1* | 11/2012 | Chmielewski et al. | 455/67.11 |
| 2012/0302241 | A1* | 11/2012 | Klingenbrunn et al. | 455/436 |
| 2014/0066061 | A1* | 3/2014 | Lou et al. | 455/434 |
| 2014/0128072 | A1* | 5/2014 | Yi et al. | 455/435.3 |

* cited by examiner

*Primary Examiner* — Hassan Kizou
*Assistant Examiner* — Hashim Bhatti
(74) *Attorney, Agent, or Firm* — Anthony Luke Simon; Reising Ethington P.C.

(57) ABSTRACT

A method of re-establishing a cellular connection between a vehicle telematics unit and a wireless carrier system includes detecting a loss of cellular connection between a vehicle telematics unit and a wireless carrier system; accessing a technology order table (TOT) that orders a plurality of radio access technologies (RATs) capable of use at the vehicle telematics unit according to desirability; attempting to re-establish the cellular connection by: determining the RAT used by the vehicle telematics unit when the loss of cellular connection was detected; searching the TOT to locate a less desirable RAT relative to the RAT used by the vehicle telematics unit when the loss of cellular connection was detected; attempting to connect with the wireless carrier system using the less desirable RAT and a group of PLMNs that is limited to home and home-equivalent PLMNs; and if that attempt fails, attempting to connect with the wireless carrier system by iterating through each of the RATs ordered in the TOT beginning with a next less desirable RAT and including in the iteration the RAT used by the vehicle telematics unit when the loss of cellular connection was detected, wherein step (c4) uses all non-forbidden PLMNs.

20 Claims, 2 Drawing Sheets

VEHICLE TELEMATICS CONNECTION RETRY

TECHNICAL FIELD

The disclosure relates to vehicle telematics units and more specifically how vehicle telematics units attempt to re-establish wireless communications with a wireless carrier system.

BACKGROUND

Wireless devices, such as cellular telephones, are commonly found in a variety of applications. In the past, cellular telephones have usually operated using only one of several cellular protocols, such as CDMA or GSM. However, more recent cellular telephone designs include cellular chipsets capable of communicating using two or more different cellular protocols so that a single device can operate on more than one cellular network. These cellular telephones are sometimes referred to as multimode phones.

Cellular or multimode telephone applications include handheld cellular telephones as well as vehicle telematics units. Yet, regardless of whether cellular telephones are used in handheld or vehicular environments, each cellular telephone application is often implemented using similar software/hardware, such as a common cellular chipset. Given that cellular/multimode telephones are used in handheld applications more frequently than vehicular applications, cellular/multimode telephone software/hardware is often optimized for handheld operation. However, this cellular/multimode telephone software/hardware can be used in a vehicle telematics unit, which may operate the software/hardware despite the handheld bias of the cellular telephone software/hardware. It can be helpful to design and implement applications for controlling the software/hardware that compensates for the handheld bias.

SUMMARY

According to an embodiment, there is provided a method of re-establishing a cellular connection between a vehicle telematics unit and a wireless carrier system. The method includes detecting a loss of cellular connection between a vehicle telematics unit and a wireless carrier system; accessing a technology order table (TOT) that orders a plurality of radio access technologies (RATs) capable of use at the vehicle telematics unit according to desirability; attempting to re-establish the cellular connection by: determining the RAT used by the vehicle telematics unit when the loss of cellular connection was detected; searching the TOT to locate a less desirable RAT relative to the RAT used by the vehicle telematics unit when the loss of cellular connection was detected; attempting to connect with the wireless carrier system using the less desirable RAT and a group of PLMNs that is limited to home and home-equivalent PLMNs; and if that attempt fails, attempting to connect with the wireless carrier system by iterating through each of the RATs ordered in the TOT beginning with a next less desirable RAT and including in the iteration the RAT used by the vehicle telematics unit when the loss of cellular connection was detected, wherein step (c4) uses all non-forbidden PLMNs.

According to another embodiment, there is provided a method of re-establishing a cellular connection between a vehicle telematics unit and a wireless carrier system. The method includes detecting a loss of cellular connection between a vehicle telematics unit and a wireless carrier system; defining a re-connection period, during which time the vehicle telematics unit will attempt reconnection to the wireless carrier system, by the length of time a vehicle battery can provide power to the vehicle telematics unit; accessing a technology order table (TOT) that orders a plurality of radio access technologies (RATs) capable of use at the vehicle telematics unit according to desirability; attempting to re-establish the cellular connection by: determining the RAT used by the vehicle telematics unit when the loss of cellular connection was detected; searching the TOT to locate a less desirable RAT relative to the RAT used by the vehicle telematics unit when the loss of cellular connection was detected; attempting to connect with the wireless carrier system using the less desirable RAT and a group of PLMNs that is limited to home and home-equivalent PLMNs; and attempting to connect with the wireless carrier system by iterating through each of the RATs ordered in the TOT beginning with a next less desirable RAT and including in the iteration the RAT used by the vehicle telematics unit when the loss of cellular connection was detected until the re-connection period ends.

BRIEF DESCRIPTION OF THE DRAWINGS

One or more embodiments of the disclosure will hereinafter be described in conjunction with the appended drawings, wherein like designations denote like elements, and wherein.

DETAILED DESCRIPTION OF THE ILLUSTRATED EMBODIMENTS

Figure 1:
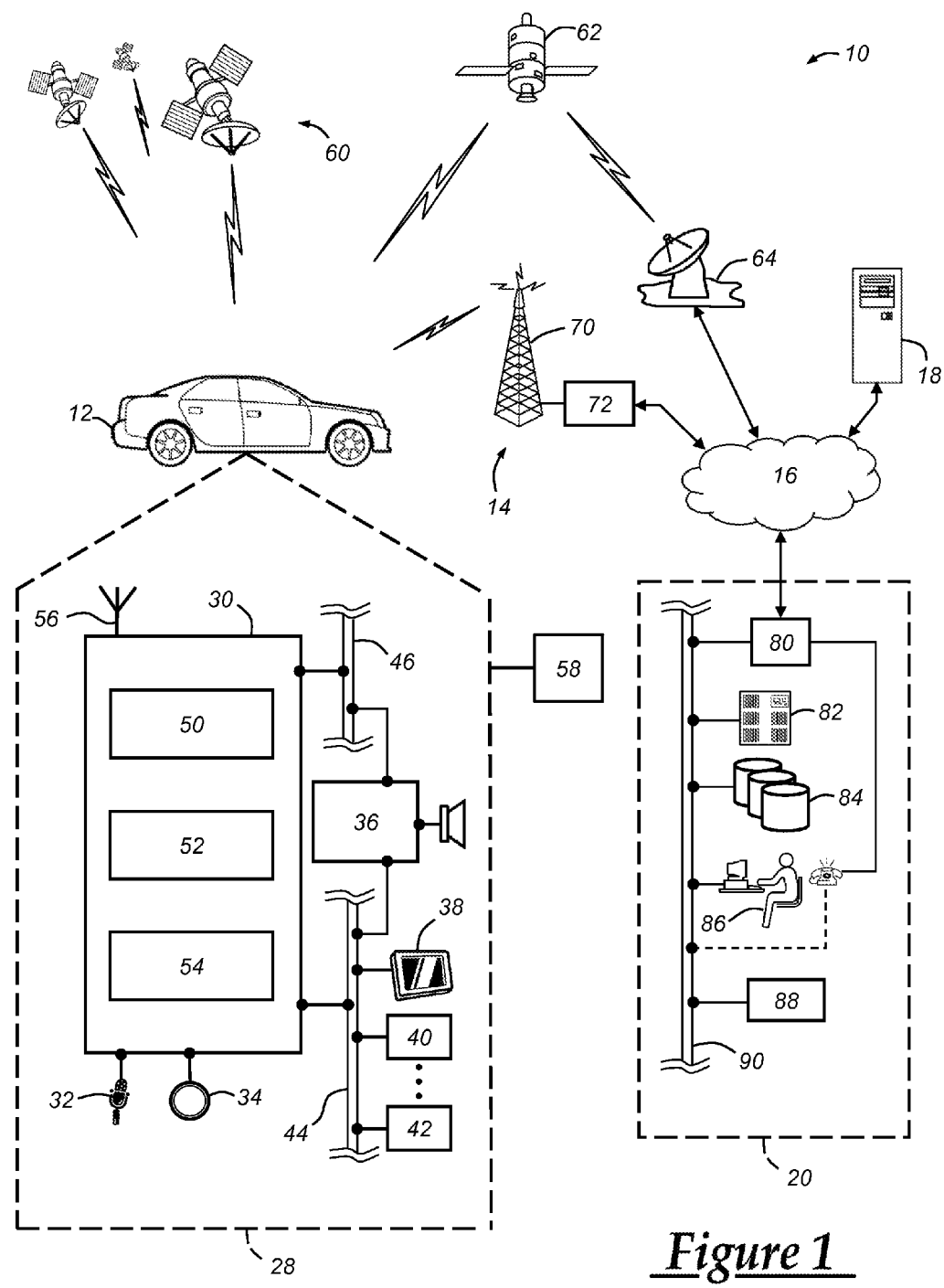
FIG. 1 is a block diagram depicting an embodiment of a communications system that is capable of utilizing the method disclosed herein.

The system and method described below re-establishes cellular communications between a vehicle telematics unit and a wireless carrier system according to unique ordered combinations of radio access technologies (RATs) and public land mobile networks (PLMNs). The retry process can also control the cellular band(s) within which portions of the method are carried out. After detecting that cellular communications have failed or that the vehicle telematics unit is no longer "camped on" a base station of a wireless carrier system, the method can the change the RAT used by the vehicle telematics unit in a particular order that is found in a technology order table (TOT) and open the number of PLMNs to be searched to include home and home-equivalent networks. And if the vehicle telematics unit is still unable to establish cellular communications, the unit can then begin searching all non-forbidden PLMNs using different RATs in the TOT. While handheld wireless devices using cellular protocols attempt to re-establish cellular communication over a relatively short time frame (e.g., 30 seconds), vehicle telematics units can benefit from a lengthier and more detailed process for re-establishing cellular communications as is described in the present method. This lengthier process can be more than five minutes and possibly continue until the battery of the vehicle no longer is able to support it.

Furthermore, the determination of whether or not the vehicle telematics unit has successfully re-established cellular communications can be determined using a software application located apart from the instructions found in a cellular chipset of the vehicle telematics unit. This arrangement can provide more a sophisticated monitoring and direction of the status of cellular communications. For example, cellular chipsets can measure successful cellular communications as the ability to successfully transmit an SMS message. While, this may indicate that the SMS message has been sent successfully, the transmission of the SMS may be interrupted by a problem somewhere in the communication infrastructure used by the wireless carrier system. In that case, the cellular chipset concludes cellular communications are successful even though the SMS message may not arrive at its destination. In contrast, using a software application located apart from the cellular chipset can monitor not only successful transmissions from the vehicle telematics unit and cellular chipset but also for responses to the SMS message. When SMS messages are successfully sent, the software application can monitor when a response has been successfully received in response to the SMS message and determine that cellular communications have been re-established. Or the software application can determine that too much time has passed without receiving a response to the SMS message and determine that a failure has occurred. Thus, the software application located apart from the cellular chipset carries out more sophisticated communication monitoring than the instructions used at the cellular chipset itself.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, EDGE, WCDMA, and LTE. These different standards can also be referred to as radio access technologies (RATs) Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

The vehicle 12 as well as the vehicle electronics 28 are powered by a vehicle battery 58. The vehicle battery 58 can take a variety of forms, such as those of a lead-acid design or lithium-ion design. In the past, vehicle battery 58 has been rated to provide approximately 12 volts (V) but in the future automotive manufacturers anticipate increasing the voltage output of the vehicle battery 58 to 40-50 V.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000 or 3G) or any one of GSM, GPRS, WCDMA, HSPA+, and LTE. These technologies can also be referred to as radio access technologies (RATs). As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
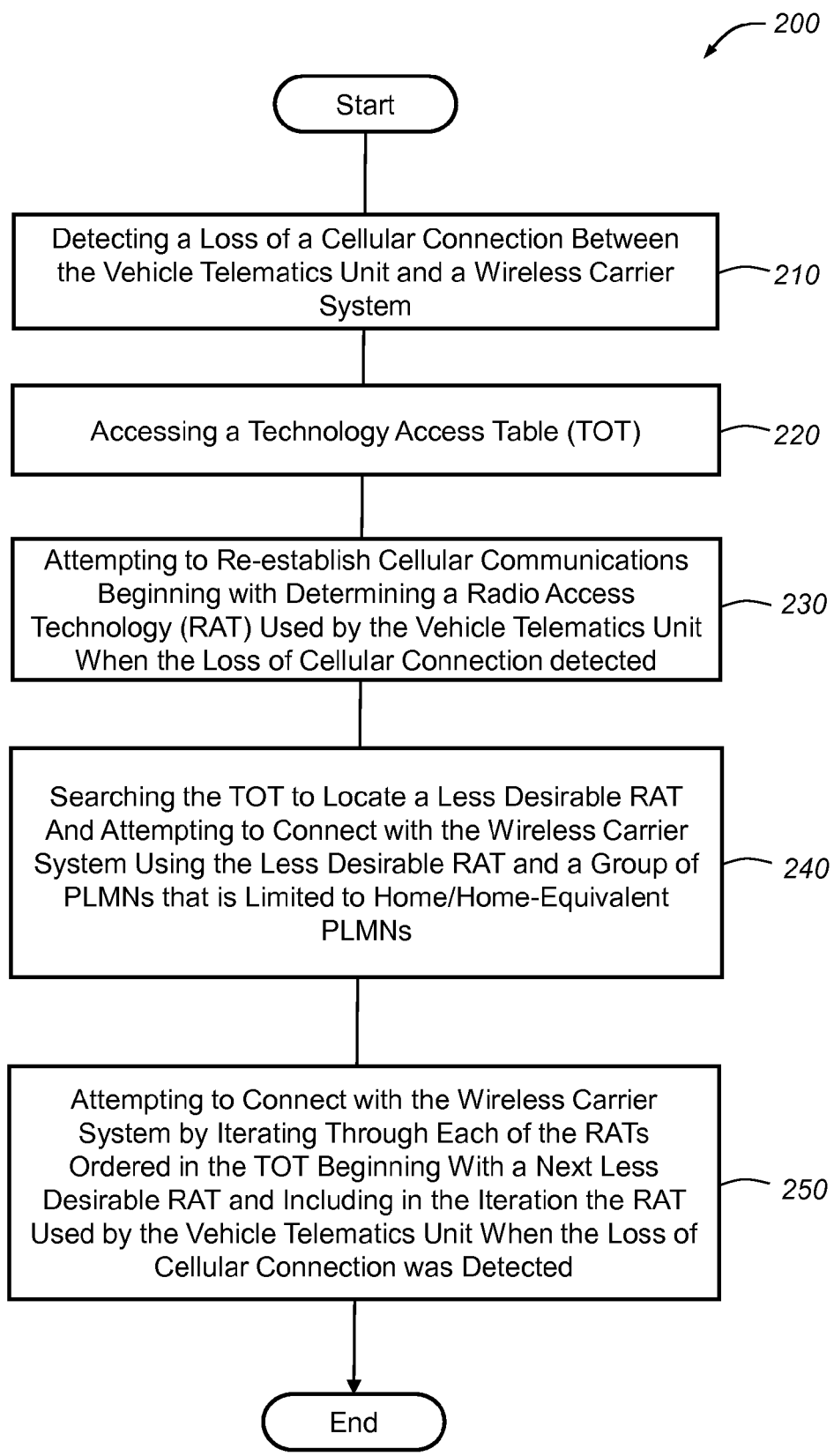
FIG. 2 is one implementation of a method of re-establishing a cellular connection between a vehicle telematics unit and a wireless carrier system.

Turning now to FIG. 2, there is shown a method 200 of re-establishing a cellular connection between the vehicle telematics unit 30 and the wireless carrier system 14. The method 200 begins at step 210 by detecting a loss of a cellular connection between the vehicle telematics unit 30 and the wireless carrier system 14. When the vehicle telematics unit 30 attaches to a cell tower 70 of the wireless carrier system 14, the unit 30 can be considered to have established a cellular connection or "camped on" the cell tower 70. Similarly, when the vehicle telematics unit 30 loses the connection such that the unit 30 is no longer camped on the cell tower 70, the unit 30 can be determined to have lost a cellular connection. The vehicle telematics unit 30 can attempt to re-establish the lost cellular connection by changing one or more cellular variables. These cellular variables include the radio access technology (RAT) used to establish the cellular connection and the PLMN through which the cellular connection is made. Each cellular connection can be determined to have a particular RAT and/or a particular PLMN. In one example, the initially established cellular connection can be a packet-data connection between the vehicle telematics unit 30 and the wireless carrier system 14 that has been established using a primary access point name (APN). APNs can identify the back office facility (e.g., computer 18) or call center 20 that the vehicle telematics unit 30 is contacting as well as various settings used to govern communications between the unit 30 and the computer 18/call center 20. In some cases, two different APNs can be used to identify one recipient, such as the computer 18/call center 20. The two different APNs can be referred to as a primary APN and a secondary APN. When the initial cellular connection via the primary APN fails, the vehicle telematics unit 30 can use the secondary APN to re-establish cellular communications. The vehicle telematics unit 30 can detect that it is no longer camped on or registered with the cell tower 70 it once was. This can be detected when the vehicle telematics unit 30 periodically attempts to maintain its registration with the cell tower 70 or when the unit 30 attempts to establish a cellular telephone connection with the wireless carrier system 14. After determining that the cellular connection is lost (or similarly registration is lost), the vehicle telematics unit 30 can begin re-establishing the connection. The method 200 proceeds to step 220.

At step 220, a technology order table (TOT) is accessed. Once the vehicle telematics unit 30 detects the loss of cellular connection, it can begin identifying cellular variables to change before attempting to re-establish cellular communication. The TOT orders a plurality of RATs capable of use at the vehicle telematics unit 30. For instance, the TOT can be stored as data in a memory device 54 located at the vehicle 12. The processor 52 of the vehicle telematics unit 30 can access and read the data from the TOT that identifies each RAT. Examples of RATs that can be used by the vehicle telematics unit 30 and included in the TOT include GSM, GPRS, WCDMA, HSPA+, and LTE, to name a few. The ordering of the TOT can be based on how desirable each RAT is relative to the other RATs. In one example, LTE can be the most desirable RAT, so it can be ranked the highest in the TOT. A less desirable RAT can be WCDMA, and a next less desirable RAT can be GSM. That is, LTE, WCDMA, and GSM can be ranked first, second, and third, respectively, with regard to how desirable the RAT is, from most desirable to least desirable. While this example of the TOT is described using LTE, WCDMA, and GSM, it should be appreciated that other combinations of RATs capable of being used by the vehicle telematics unit 30 may also be used. In one implementation, the TOT can use a circular queue that orders the RATs with respect to their desirability and the iterates through the queue or list such that the TOT outputs a particular order of RATs without disruption of this order. In other words, the circular queue would not be able to jump from the most desirable RAT to the third most desirable RAT by skipping the second most desirable RAT. It should be appreciated that the selection of RATs in the TOT occurs manually away from the internal decision making of the cellular chipset. The method 200 proceeds to step 220.

At step 230, the vehicle telematics unit 30 attempts to re-establish the cellular connection. First, the method 200 determines the RAT used by the vehicle telematics unit 30 when the loss of cellular connection was detected. For instance, the vehicle telematics unit 30 can determine the RAT as well as the PLMN used when cellular communication was lost. In one example, the vehicle telematics unit 30 could have been using LTE. In that case, the vehicle telematics unit 30 could recognize on its own that it is (or was) communicating using LTE. And as part of communicating with the cell tower 70, the vehicle telematics unit 30 can receive a network code indicating the identity of the particular PLMN used. The vehicle telematics unit 30 can store this code as a most-recently used PLMN and access it when needed.

At step 240, the TOT is searched to locate a less desirable RAT relative to the RAT used by the vehicle telematics unit 30 when the loss of cellular connection was detected and an attempt is made to connect with the wireless carrier system 14 using the less desirable RAT and a group of PLMNs that is limited to home and home-equivalent PLMNs. The method 200 can locate a less desirable RAT because may know that service has already been lost using the more-desirable RAT. Thus, the less desirable RAT may increase chances of connection. After the vehicle telematics unit 30 has determined that the cellular connection has been lost, both the RAT used for re-establishing communication and the scope of the PLMNs used change. Using the example above in which the vehicle telematics unit 30 had been communicating using LTE, the telematics unit 30 then identifies a different RAT to use when re-establishing communications and opens the possible PLMN selection to not only the last PLMN used but to any PLMN that is considered a home network or a home-equivalent network. Here, a home network is a wireless carrier system 14 that provides a cellular subscription to the vehicle telematics unit 30 such that an identifier of the unit 30 is found in a home location register (HLR). Home-equivalent networks can be wireless carrier systems 14 other than the home network that have reciprocal agreements in place to service the vehicle telematics unit 30 when roaming. In this example, if the vehicle telematics unit 30 had been operating using LTE and camped on a cell tower operated by a home network, the unit 30 can then access the TOT, locate LTE and its corresponding place in the order of desirability, and then select the less desirable RAT—WCDMA. In addition to changing the RAT from LTE to WCDMA, the vehicle telematics unit 30 can begin searching for cellular connections that are either provided by the home network or home equivalent networks.

It should be appreciated that step 240 can be modified to incorporate a cellular band search contour in addition to or instead of controlling the PLMN variables. Again referring to the example above in which the vehicle telematics unit 30 loses a cellular connection using LTE and begins using WCDMA after searching the TOT, the unit 30 can also be programmed to control the cellular band(s) searched during the method 200. For instance, the vehicle telematics unit 30 can begin using WCDMA and limit the attempts to one cellular band (or frequency band), such as 850 MHz. Alternatively, the vehicle telematics unit 30 can begin using WCDMA and limit the search to multiple cellular bands, such as 850 MHz and 1700 MHz. In yet another implementation, the vehicle telematics unit 30 can also use the secondary APN to re-establish the cellular connection.

If step 240 is successful, the method 200 ends. Otherwise, an attempt is made at step 250 to connect with the wireless carrier system 14 by iterating through each of the RATs ordered in the TOT beginning with a next less desirable RAT and including in the iteration the RAT used by the vehicle telematics unit 30 when the loss of cellular connection was detected. The iteration can also begin using all non-forbidden PLMNs. Continuing the example from above, after the vehicle telematics unit 30 determines that attempts to re-establish the cellular connection have failed using the less desirable RAT, the unit 30 can access the TOT and locate the next less desirable RAT. In this example, if the less desirable RAT is WCDMA, the next less desirable RAT can be GSM. Then, the vehicle telematics unit 30 can use GSM to make attempts to re-establish cellular communications and also widen the scope of the PLMNs searched to include all non-forbidden PLMNs and not just the home or home-equivalent networks. Forbidden networks can be identified by searching a list of network identifiers stored at the vehicle 12. The list can be established by the wireless carrier system 14 and identify other carriers the system 14 does not want the unit 30 using. For each RAT or RAT/PLMN combination attempted, the vehicle telematics unit 30 can apply a timer to limit the amount of time allotted to establish a cellular connection. In one example, the timer can be set to no more than thirty seconds. A second, global timer can also be used to govern an amount of time the vehicle telematics unit 30 is allowed to make attempts for each RAT.

The method 200 can continue to use the TOT to control the subsequent order in which the identities of RATs are selected. In one example, the TOT can be a circular queue of RATs and the vehicle telematics unit 30 can continue attempting cellular connections over all non-forbidden PLMNs according to this queue. In the example provided in which the TOT includes LTE, WCDMA, and GSM, respectively, the method 200 can next attempt cellular connections using LTE as the selected RAT until a timer indicates that the next RAT in the TOT should be selected. At this point, the method 200 selects the most desirable RAT for the first time during the method 200. Since the TOT does not include any more less desirable RATs, the method 200 can begin at the beginning of the list with the most desirable RAT. It should also be appreciated that the method 200 can be limited by the amount of time the vehicle battery 58 can provide power to the vehicle telematics unit 30. Unlike the approximately 30 second long retry strategies used by handheld wireless devices, the vehicle telematics unit 30 can continue to re-establish cellular communications using the method 200 until the vehicle battery 58 can no longer provide enough power for the unit 30 to function. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of re-establishing a cellular connection between a vehicle telematics unit and a wireless carrier system, comprising the steps of:
   (a) detecting a loss of cellular connection between a vehicle telematics unit and a wireless carrier system;
   (b) accessing a technology order table (TOT) that orders a plurality of radio access technologies (RATs) capable of use at the vehicle telematics unit according to desirability;
   (c) attempting to re-establish the cellular connection by:
      (c1) determining the RAT used by the vehicle telematics unit when the loss of cellular connection was detected;
      (c2) searching the TOT to locate a less desirable RAT relative to the RAT used by the vehicle telematics unit when the loss of cellular connection was detected;
      (c3) attempting to connect with the wireless carrier system using the less desirable RAT and a group of PLMNs that is limited to home and home-equivalent PLMNs; and
      (c4) if step (c3) fails, attempting to connect with the wireless carrier system by iterating through each of the RATs ordered in the TOT beginning with a next less desirable RAT and including in the iteration the RAT used by the vehicle telematics unit when the loss of cellular connection was detected, wherein step (c4) uses all non-forbidden PLMNs.

2. The method of claim 1, further comprising the step of limiting the attempts to re-establish the cellular connection to within one cellular band.

3. The method of claim 1, further comprising the step of attempting to re-establish the cellular connection using one of the RATs included on the TOT across multiple cellular bands.

4. The method of claim 1, wherein the method of re-establishing the cellular connection is controlled by an application stored apart from a cellular chipset.

5. The method of claim 1, further comprising the use of two timers to regulate the re-establishing of the cellular connection, a first timer providing less than thirty seconds for the vehicle telematics unit to establish the cellular connection with the wireless carrier system using one of the RATs included in the TOT and a second timer that controls a total amount of time allotted for re-establishing the cellular connection.

6. The method of claim 1, wherein steps (a)-(c) are used to establish a packet-data connection via the wireless carrier system.

7. The method of claim 6, further comprising the step of determining that the packet-data connection has failed and attempting a voice call.

8. The method of claim 1, wherein the attempt to establish the cellular connection is determined to be successful when an application stored apart from a cellular chipset confirms communications sent from the vehicle telematics unit are received by a call center or a computer.

9. The method of claim 1, further comprising the step of initially establishing the cellular connection as a packet-data connection between the vehicle telematics unit and the wireless carrier system using a primary access point name (APN).

10. The method of claim 9, further comprising the step of attempting to re-establish the cellular connection using a secondary APN.

11. A method of re-establishing a cellular connection between a vehicle telematics unit and a wireless carrier system, comprising the steps of:
   (a) detecting a loss of cellular connection between a vehicle telematics unit and a wireless carrier system;
   (b) defining a re-connection period, during which time the vehicle telematics unit will attempt reconnection to the wireless carrier system, by the length of time a vehicle battery can provide power to the vehicle telematics unit;
   (c) accessing a technology order table (TOT) that orders a plurality of radio access technologies (RATs) capable of use at the vehicle telematics unit according to desirability;
   (d) attempting to re-establish the cellular connection by:
      (d1) determining the RAT used by the vehicle telematics unit when the loss of cellular connection was detected;
      (d2) searching the TOT to locate a less desirable RAT relative to the RAT used by the vehicle telematics unit when the loss of cellular connection was detected;
      (d3) attempting to connect with the wireless carrier system using the less desirable RAT and a group of PLMNs that is limited to home and home-equivalent PLMNs; and
      (d4) if step (d3) fails, attempting to connect with the wireless carrier system by iterating through each of the RATs ordered in the TOT beginning with a next less desirable RAT and including in the iteration the RAT used by the vehicle telematics unit when the loss of cellular connection was detected, wherein step (d4) uses all non-forbidden PLMNs until the re-connection period ends.

12. The method of claim 11, further comprising the step of limiting the attempts to re-establish the cellular connection to within one cellular band.

13. The method of claim 11, further comprising the step of attempting to re-establish the cellular connection using one of the RATs included on the TOT across multiple cellular bands.

14. The method of claim 11, wherein the method of re-establishing the cellular connection is controlled by an application stored apart from a cellular chipset.

15. The method of claim 11, further comprising the use of a timer to regulate the re-establishing of the cellular connection, wherein the timer provides less than thirty seconds for the vehicle telematics unit to establish the cellular connection with the wireless carrier system using one of the RATs included in the TOT.

16. The method of claim 11, wherein steps (a)-(d) are used to establish a packet-data connection via the wireless carrier system.

17. The method of claim 16, further comprising the step of determining that the packet-data connection has failed and attempting a voice call.

18. The method of claim 16, wherein the attempt to establish the cellular connection is determined to be successful when an application stored apart from a cellular chipset confirms communications sent from the vehicle telematics unit are received by a call center or a computer.

19. The method of claim 16, further comprising the step of initially establishing the cellular connection as a packet-data connection between the vehicle telematics unit and the wireless carrier system using a primary access point name (APN).

20. The method of claim 19, further comprising the step of attempting to re-establish the cellular connection using a secondary APN.

\* \* \* \* \*